(12) United States Patent
Jones (10) Patent No.: US 6,637,759 B2
(45) Date of Patent: Oct. 28, 2003

(54) TRANSFORMABLE RIDING TOY

(76) Inventor: Myra L. Jones, 554, 4th Ave., Jonesborough, TN (US) 37659

(*) Notice: Subject to any disclaimer, the term of this patent is extended or adjusted under 35 U.S.C. 154(b) by 16 days.

(21) Appl. No.: 10/082,953

(22) Filed: Feb. 26, 2002

(65) Prior Publication Data

US 2003/0160406 A1 Aug. 28, 2003

(51) Int. Cl.$^7$ .................................................. B62M 1/00
(52) U.S. Cl. ...................... 280/30; 280/7.15; 280/7.17; 280/1.188; 280/828; 446/71; 446/95
(58) Field of Search ............................. 280/827, 1.188, 280/1.189, 87.01, 87.021, 87.05, 210, 30, 658, 643, 7.1, 7.15, 7.17, 214, 259, 828; 108/50.11, 153.1; 296/177, 103; 180/65.1; D21/424, 431, 533, 537; 446/71, 78, 93, 94, 95, 451

(56) References Cited

U.S. PATENT DOCUMENTS

| | | | | |
|---|---|---|---|---|
| 996,636 A | * | 7/1911 | Gabriel | |
| D141,925 S | * | 7/1945 | Nudelman | ................. D21/537 |
| 3,462,874 A | | 8/1969 | Pauly et al. | |
| D215,166 S | * | 9/1969 | Richardson | ................. D21/431 |
| 4,095,816 A | | 6/1978 | Langieri | |
| 4,236,344 A | | 12/1980 | Kelly | |
| 4,346,908 A | | 8/1982 | Kassai | |
| D267,100 S | * | 11/1982 | Magnusson | ................. D21/431 |
| 4,513,981 A | | 4/1985 | DeGraaff et al. | |
| 4,562,893 A | | 1/1986 | Cunard | |
| D285,326 S | * | 8/1986 | Clark | ................. D21/537 |
| 5,294,153 A | | 3/1994 | Nolan | |
| D359,769 S | * | 6/1995 | Goncalves | ................. D21/537 |
| D366,071 S | | 1/1996 | Harrod | |
| 6,165,044 A | | 12/2000 | Lamar, Jr. | |
| 6,446,981 B1 | * | 9/2002 | Wise et al. | ................. 280/7.17 |
| 6,508,320 B2 | * | 1/2003 | Huntsberger et al. | ...... 180/65.1 |
| 6,508,322 B2 | * | 1/2003 | Dignitti et al. | ........ 180/65.1 X |

* cited by examiner

*Primary Examiner*—Brian L. Johnson
*Assistant Examiner*—Bryan Fischmann
(74) *Attorney, Agent, or Firm*—Dale J. Ream (57) ABSTRACT

A transformable riding toy includes a frame having front, rear, and central portions with a seat for a child. The toy includes a canopy having a top panel and a plurality of legs coupled to the central portion of the frame. The canopy is removable from the frame for use as a table. The toy also includes a digger assembly mounted to the rear portion of the frame and having a bucket with wheels that is removable, the bucket being operative as a wagon when removed. The toy includes a front-end loader assembly coupled to the front portion of the frame and having a bucket with a removable panel, the front-end loader bucket being operative as a bench when removed.

17 Claims, 10 Drawing Sheets

TRANSFORMABLE RIDING TOY

BACKGROUND OF THE INVENTION

The present invention relates generally to riding toys for children and, more particularly, to a riding toy having assemblies that may selectively be operated as part of the riding toy or removed and transformed into other toys or playthings.

Children find great entertainment in pretending to operate adult-type vehicles or power equipment. Thus, many toys are adapted to simulate the appearance of adult vehicles like trucks, tractors, military vehicles, etc. These toy vehicles may even be motorized so as to be "driven" by a child, or may include more traditional pedal means, or may simply require the child to impart motion with his feet alone.

Various toy devices have been proposed in the art for simulating vehicles or machinery, such as in U.S. Pat. Nos. 3,462,874 and 6,165,044. Although assumably effective for their intended purposes, existing devices do not provide a riding toy that is transformable into a number of different and unrelated toys or playthings.

Therefore, it is desirable to have a transformable riding toy having at least one portion that is selectively usable as part of the riding toy when coupled thereto or as a different plaything when removed therefrom. Further, it is desirable to have a transformable riding toy that may be operated as a riding toy or as multiple other toys unrelated to a riding toy.

SUMMARY OF THE INVENTION

A transformable riding toy according to the present invention includes a body frame having front, rear, and central portions. The central portion includes a deck upon which seat suitable for a child is mounted. The body frame is coupled to rear wheels and front wheels and includes a linkage for a user to impart motion to the rear wheels. The riding toy includes a canopy having a top panel with a plurality of legs extending downwardly therefrom. The canopy legs are releasably coupled to the central and front portions of the body frame such that the entire canopy may be removed therefrom and used as a child's picnic table or tent. In addition, a digger assembly is mounted to the rear portion of the body frame. The digger assembly includes first and second arms coupled in a pivotal configuration with a first bucket releasably coupled to a free end of the second arm. The first bucket includes a plurality of wheels such that the first bucket is operable as a wagon when released from the digger assembly. The riding toy further includes a front-end loader assembly having at least one guide arm coupled to the front portion of the body frame. A second bucket (scoop) is releasably coupled to a distal end of the at least one guide arm. The second bucket includes a rear wall that may be slidably repositioned to cover the second bucket opening and act as a seat. Therefore, the second bucket is operable as a bench when removed from the front-end loader assembly. In addition, hubs of the rear wheels as well as the front portion of the body frame define compartments for storing miscellaneous articles.

Therefore, a general object of this invention is to provide a riding toy that is transformable into other toys or playthings unrelated to a riding toy.

Another object of this invention is to provide a riding toy, as aforesaid, which includes assemblies indicative of an adult-style digging machine that are removable and operable as toys unrelated to a digging machine.

Still another object of this invention is to provide a riding toy, as aforesaid, having a canopy that is removable and transformable into a children's picnic table.

Yet another object of this invention is to provide a riding toy, as aforesaid, having a digger assembly with a bucket that is removable and operable as a wagon.

A further object of this invention is to provide a riding toy, as aforesaid, having a front-end loader assembly with a bucket that is removable and operable as a bench.

A still further object of this invention is to provide a riding toy, as aforesaid, that includes foot pedals or an electric motor to operate the rear wheels and move the toy.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 3b is an isolated perspective view on an enlarged scale of a door closure recess as in FIG. 3a;

DESCRIPTION OF THE PREFERRED EMBODIMENT

Figure 1:
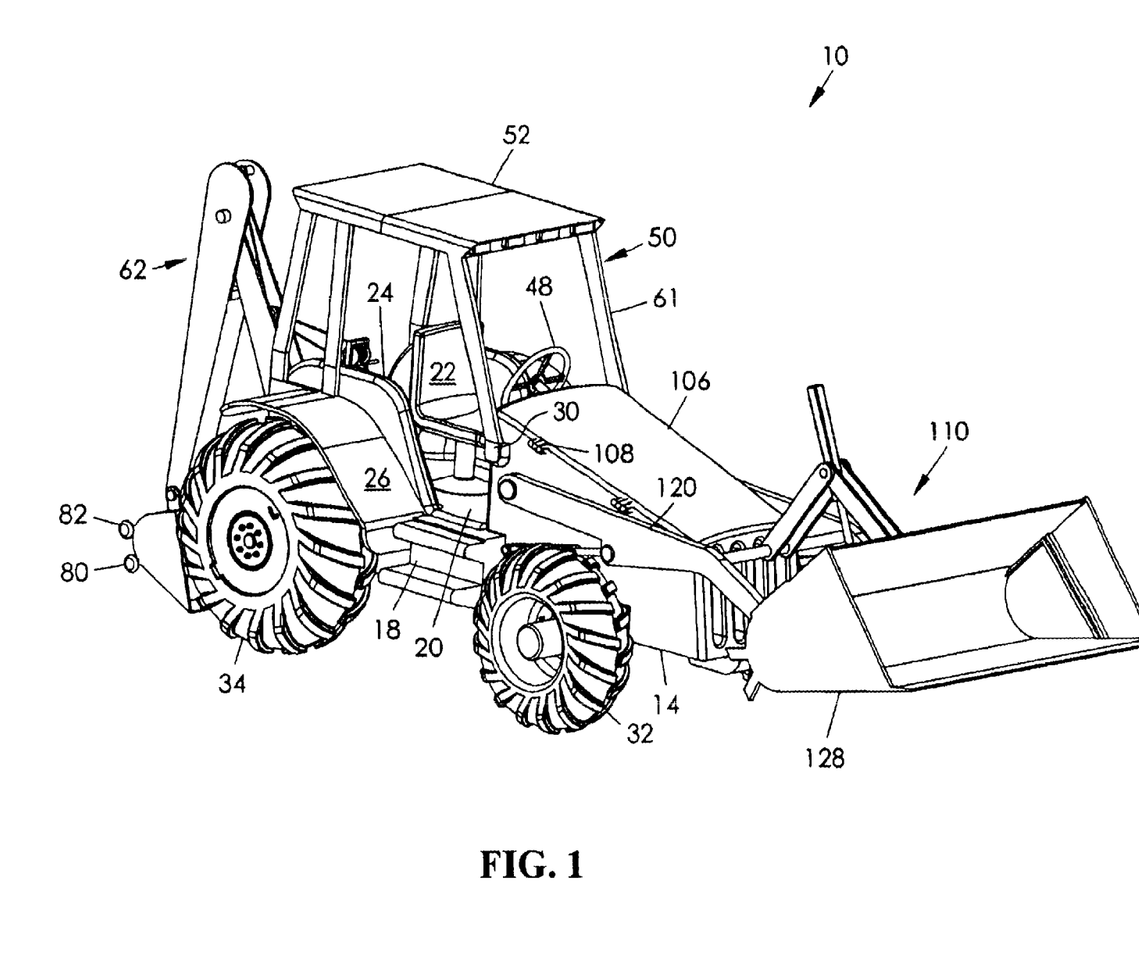
FIG. 1 is a perspective view of a riding toy according to a preferred embodiment of the present invention.

A transformable riding toy 10 according to a preferred embodiment of the present invention will now be described in detail with reference to FIGS. 1 through 10 of the accompanying drawings. The riding toy 10 includes a body frame having a front portion 14, rear portion 16, and a central portion 18 intermediate the front and rear portions (FIG. 1). The central portion 18 includes a deck 20 upon which a seat 22 is mounted, the seat preferably being rotatably mounted atop an upstanding pole. A pair of upstanding side walls 24 are fixedly attached to side edges of the deck 20 and a pair of fenders 26 extend generally perpendicularly and outwardly from respective side walls 24. Upstanding posts 28 are positioned along the fenders 26 and on opposed flanges 30 attached to the front portion 14 of the body frame (FIG. 9), said posts to be described in more detail below.

The body frame is coupled to a pair of rear wheels 34 and to a pair of front wheels 32, each pair of wheels being connected by an axle in a conventional manner. Preferably, the riding toy 10 includes a pair of pedals 46 positioned in front of the seat 22 and below a steering wheel 48, the pedals being connected to a rear axle with a linkage (not shown) such that a child's manipulation of the pedals 46 causes the axle to rotate. Of course, the riding toy 10 may alternatively include a battery-powered electric motor by which the riding toy 10 may be selectively propelled. Further, the deck 20 may simply define a hole for allowing a child's feet to touch the ground for moving the riding toy 10.

Figure 4:
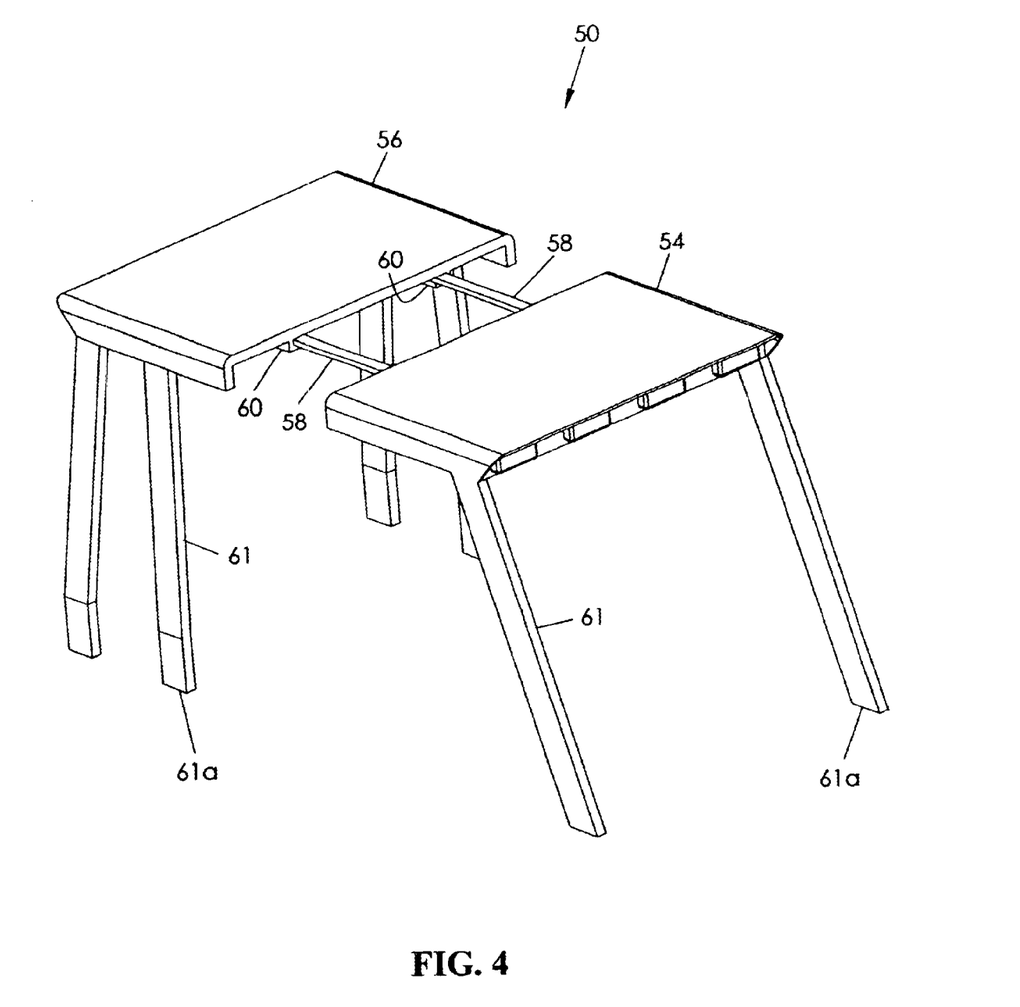
FIG. 4 is a perspective view of a canopy removed from the riding toy as in FIG. 1 in an extended configuration.

The riding toy 10 includes a canopy 50 having a top panel 52 and a plurality of legs 61 depending from side walls of the top panel 52 (FIGS. 1 and 4). Each leg 61 includes a distal/free end 61a relative to the top panel 52. The free end 61a of each leg 61 defines a shallow bore (not shown) having a configuration complementary to that of a respective post 28 such that the canopy 50 may be removably mounted to the fenders 26 and front portion 14 of the body frame by friction fit or snap-fit relationships between the posts and bores. The top panel 52 of the canopy 50 includes first 54 and second 56 sections. A pair of spaced apart guide rods 58 are fixedly attached to a bottom surface of the first section 54 and extend in the direction of the second section 56 along a plane parallel to the top panel 52 (FIG. 4). A pair of spaced apart guide members 60 extend longitudinally along a bottom surface of the second section 56, each guide member defining a longitudinal bore complementary to respective guide rods 58. Therefore, the first 54 and second 56 sections of the top panel 52 are slidably movable between a first configuration in which the guide rods are substantially received in the bores of respective guide members 60 and a second configuration in which the guide rods are substantially extended from the bores of respective guide members 60. The canopy 50 further includes an auxiliary section (not shown) adapted to rest upon the guide rods 58 when the first 54 and second 56 sections are extended apart. Thus, the canopy 50 may be used as an expanded children's picnic table or could also be used to simulate a tent.

Figure 8:
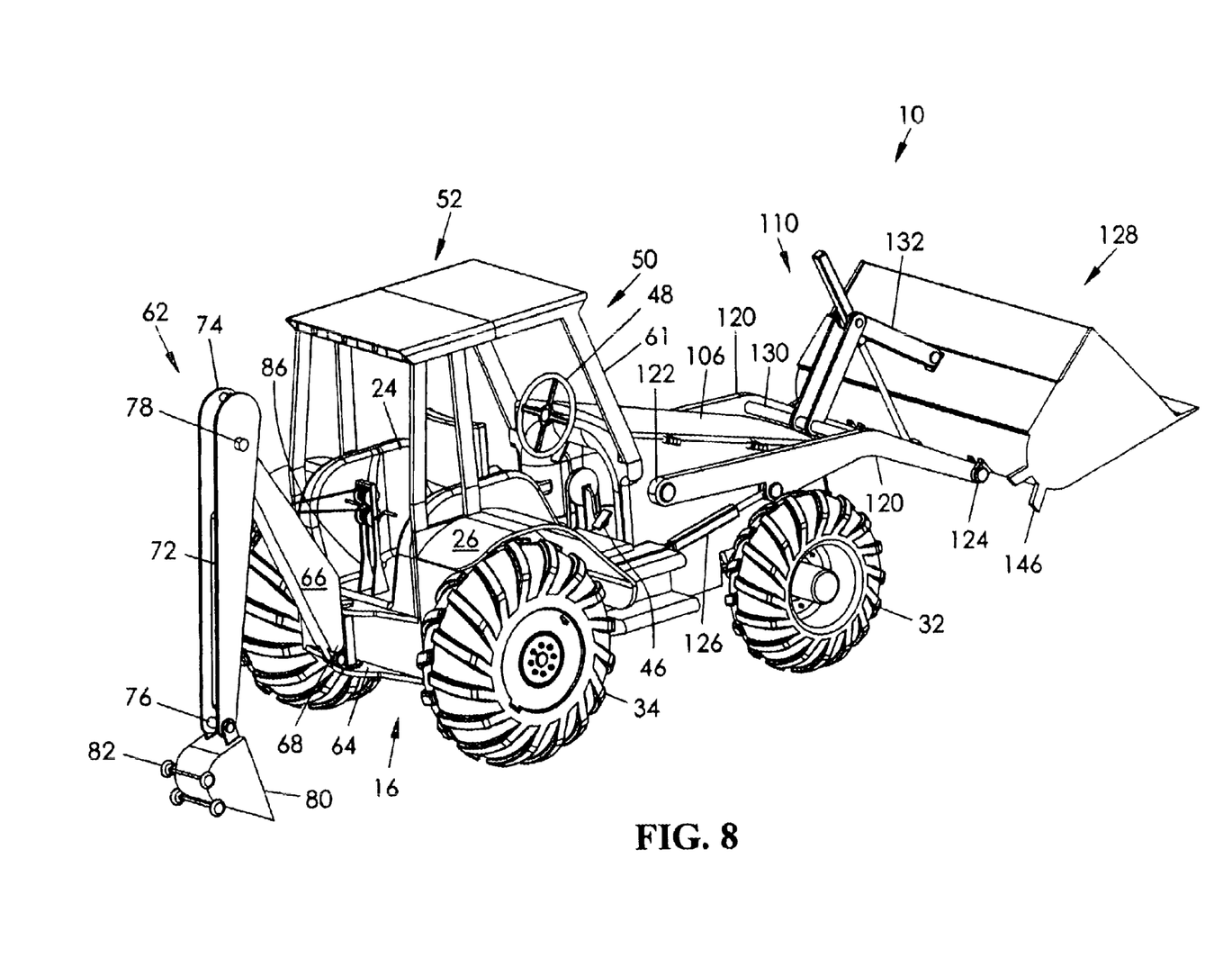
FIG. 8 is a rear perspective view of the riding toy as in FIG. 1.
Figure 9:
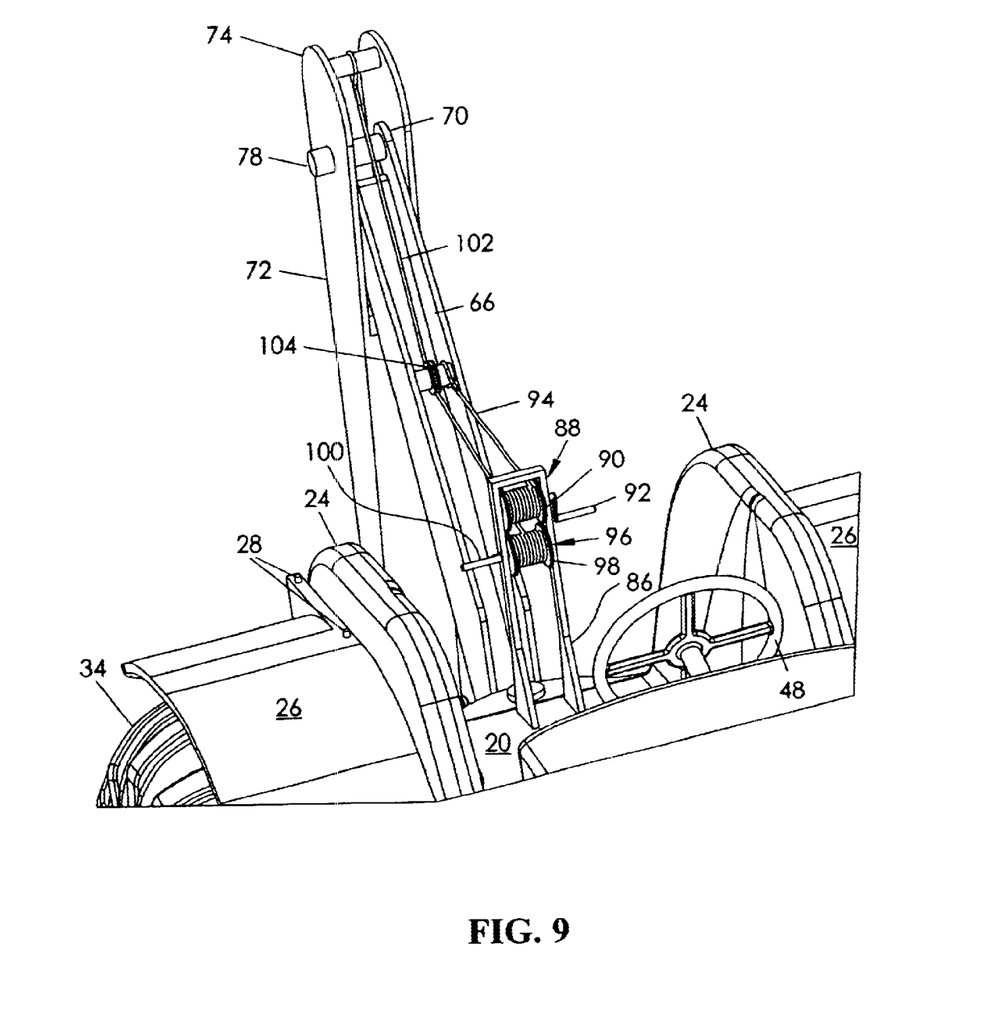
FIG. 9 is a fragmentary perspective view of a digger assembly of the riding toy as in FIG. 1.

The riding toy 10 further includes a digger assembly 62 having a mounting bracket 64 pivotally coupled to the rear portion 16 of the body frame with a vertical pin such that the digger assembly 62 may swing laterally between the rear wheels 34 (FIG. 8). More particularly, the digger assembly 62 includes a first arm 66 having a first end 68 pivotally coupled to the mounting bracket 64 with a pin such that a second end 70 of the first arm 66 is capable of up/down movement. The digger assembly 62 includes a second arm 72 having opposed first 74 and second 76 ends. The second arm 72 is pivotally coupled to the second end 70 of the first arm 66 with a pin 78 displaced from the first end 74 of the second arm 72 (FIG. 9). In other words, the pin 78 is positioned so as to form a pivot point whereby a movement of the first end 74 of the second arm 72 causes an opposing movement of the second end 76 thereof, as to be described more fully below. It should be understood, of course, that the digger assembly 62 could be provided without pivotal connections.

Figure 10:
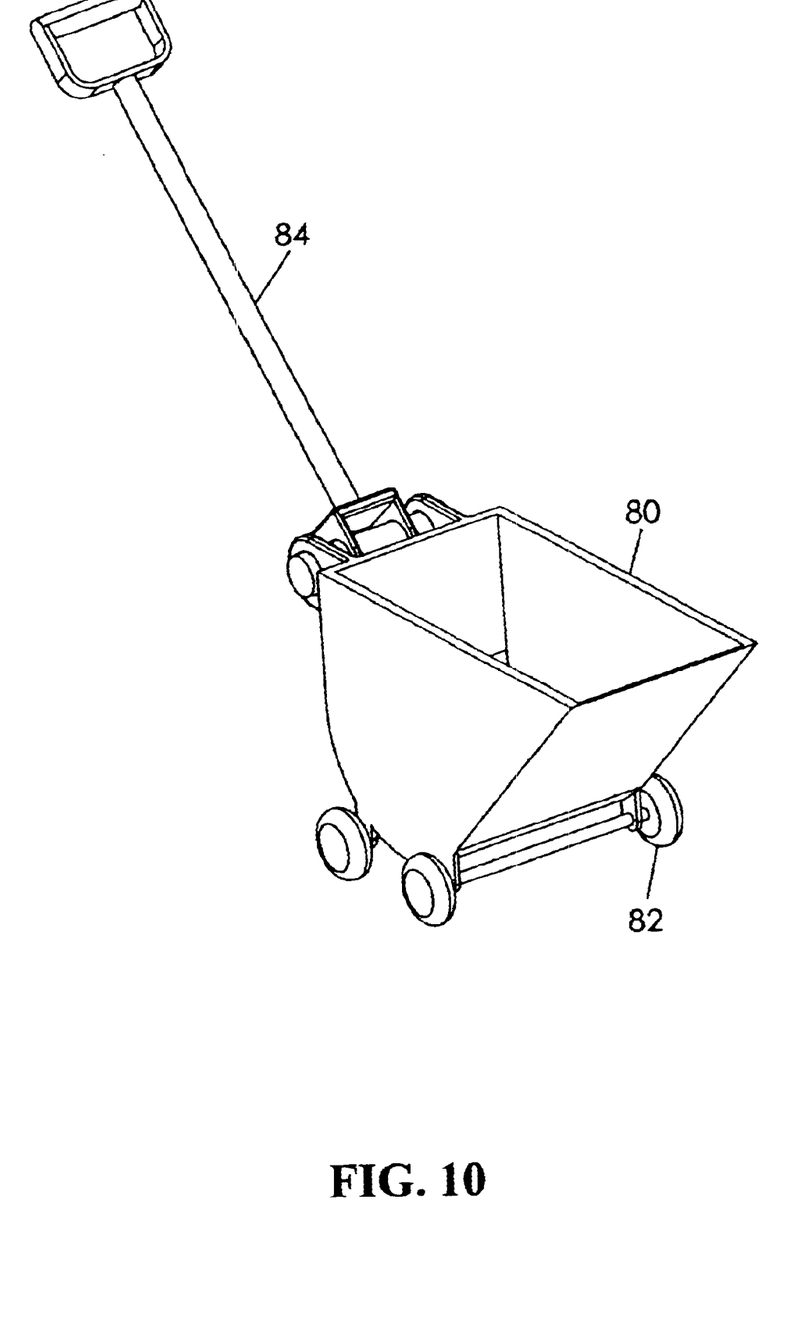
FIG. 10 is a perspective view of a bucket removed from the digger assembly with an auxiliary handle coupled thereto.

A digger bucket 80 is pivotally and releasably coupled to the second end 76 of the second arm 72 (FIG. 8). The bucket 80 includes a plurality of wheels 82 along a bottom wall thereof. Therefore, the bucket 80 may be released from the digger assembly 62 and supported by its wheels 82 upon a ground surface. An auxiliary handle 84 may also be provided for pivotal connection to the bucket 80 such that the bucket 80 may be operated as a wagon when removed from the digger assembly 62 (FIG. 10).

The digger assembly 62 further includes first 88 and second 96 reel assemblies rotatably mounted upon an upstanding support frame 86 on the deck 20 of the central portion 18 of the body frame (FIGS. 8 and 9). It is understood that the support frame 86 is mounted immediately adjacent the rear portion 16 and could actually be coupled to the rear portion proper. The first reel assembly 88 includes a first spool 90 having with a first handle 92 fixedly attached thereto for rotating the first spool. A first cable 94 includes a first end fixedly attached to the first spool 90 and a second end fixedly attached to the first arm 66 such that an operation of the first handle 92 causes the first arm 66 to be pivoted in a forward/rearward (e.g. generally up/down) manner. The first reel assembly 88 also includes a ratchet/pawl mechanism (not shown) for holding the first spool 90 at a selected configuration.

A second reel assembly 96 is also rotatably mounted to the support frame 86 and has a construction substantially similar to that of the first reel assembly 88. More particularly, the second reel assembly 96 includes a second spool 98 having a second handle 100 fixedly attached thereto for selectively rotating the second spool 98. A second cable 102 includes a first end fixedly attached to the second spool 98 and a second end fixedly attached to the first end 74 of the second arm 72 such that an operation of the second handle 100 causes a forward or rearward movement of the first end 74 of the second arm 72 and an opposing movement of the second end 76 of the second arm 72 due to the pivot point established by the pin 78. It is understood that a pulley 104 may be used to guide the second cable 102 between the second spool 98 and the second arm (FIG. 9). The second spool 98 also includes a ratchet/pawl mechanism (not shown) for releasably holding the second spool 98 at a selected configuration.

The riding toy 10 further includes a front-end loader assembly 110 mounted to the front portion 14 of the body frame (FIG. 1). Preferably, the front-end loader assembly 110 includes a pair of support arms 120, each support arm having a first end 122 pivotally coupled to the front portion 14 of the body frame. It is understood, however, that a single support arm would also work in a suitable configuration. Simulated piston/cylinder combinations 126 may also be attached to the front portion 14 and connected to respective support arms 120 such that the pistons are extended or retracted upon pivotal movement of the support arms 120 (FIG. 8). A bucket 128 having a scoop-shaped configuration is pivotally and releasably coupled to second ends 124 of the support arms 120 with pins or like fasteners. A cross-brace 130 extends between the support arms 120 and an auxiliary support arm 132 extends between the cross-brace 130 and the bucket 128 (FIGS. 1 and 8). Another simulated piston/cylinder combination extends between the auxiliary support arm 132 and bucket 128.

Figure 5:
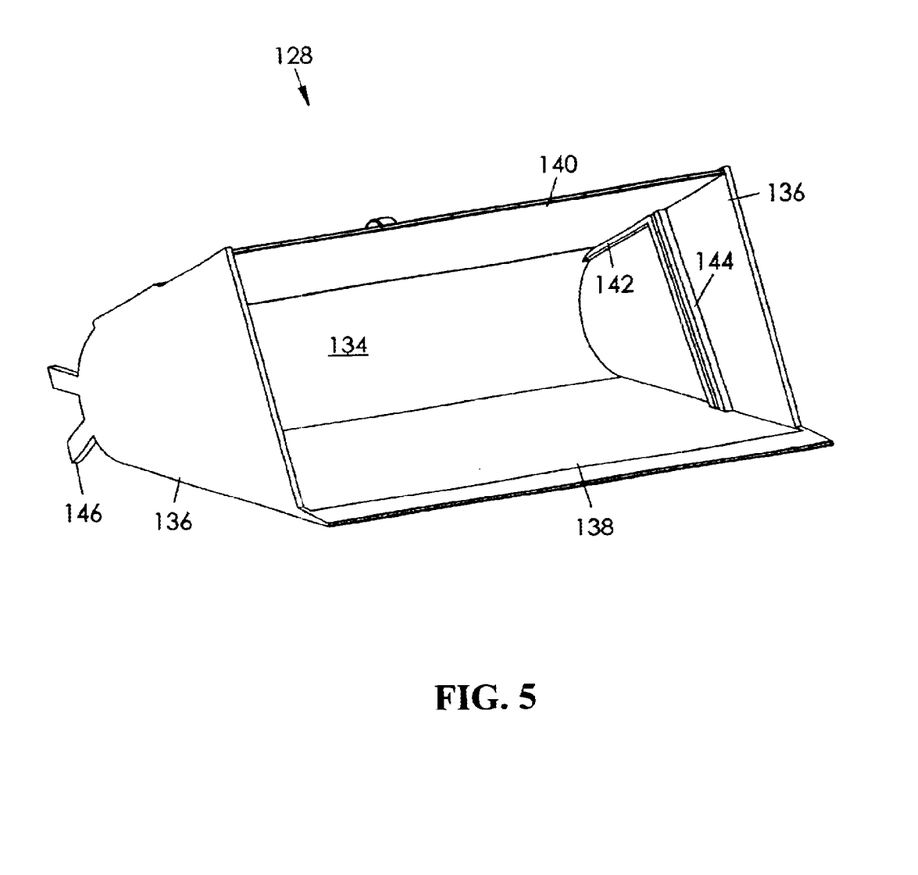
FIG. 5 is a perspective view of a front-end loader bucket removed from a front-end loader assembly as in FIG. 1 and with a rear wall positioned in a scoop configuration.
Figure 6:
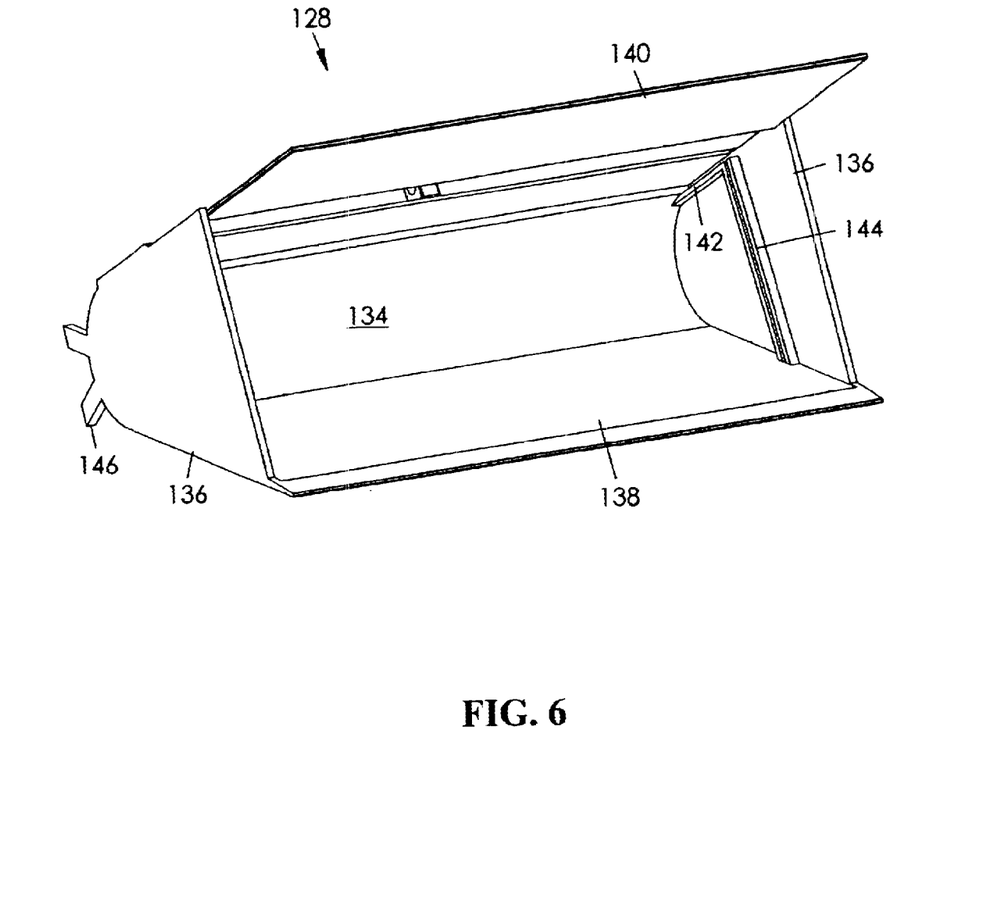
FIG. 6 is another perspective view of the front-end loader bucket as in FIG. 5 with a rear wall removed therefrom.
Figure 7:
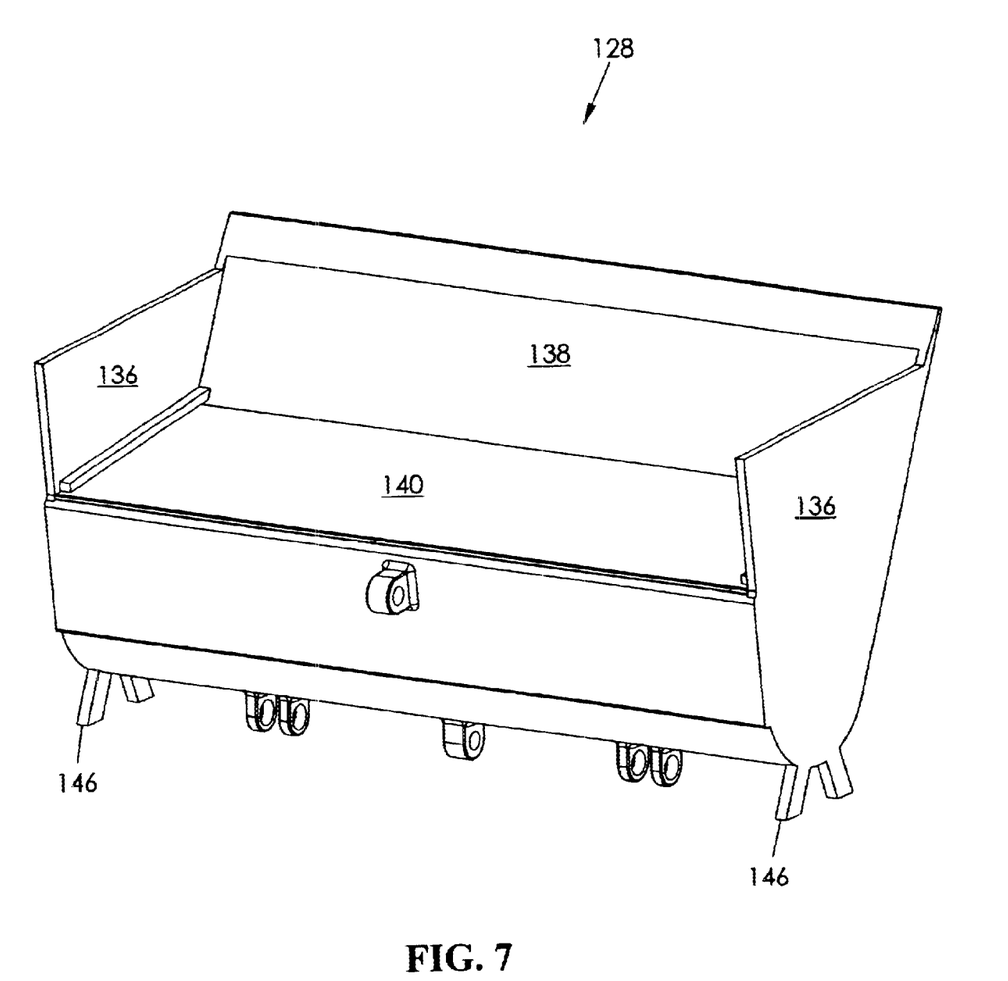
FIG. 7 is another perspective view of the front-end loader bucket as in FIG. 6 with the rear wall positioned in a bench configuration.

The scoop-shaped bucket 128 includes a generally annular bottom wall 134 extending between opposed side walls 136. Opposed front 138 and rear 140 walls extend generally upward from the bottom wall 134. In combination, these walls define an open top. A pair of first guide members 142 are attached to inner surfaces of the side walls 136, each first guide member defining a channel generally perpendicular to the bottom wall 134 (FIG. 5). The channels of the first guide members 142 are configured to slidably receive the rear wall 140 therein, the rear wall thus being slidably removable from the bucket 128 (FIG. 6). A pair of second guide members 144 are attached to inner surfaces of the side walls 136, each second guide member defining a channel perpendicular to the first guide members 142 (FIG. 5). The channels of the second guide members 144 are configured to slidably receive the rear wall 140 therein. Therefore, the rear wall 140 may be slidably positioned in the channels of the second guide members 144 and used as a bench when the rear wall 140 is removed from the first guide members (FIG. 7). A pair of picnic table bench-style legs 146 are fixedly attached to the bottom wall 134 at the juncture between the bottom wall 134 and respective side walls 136 for supporting the bucket 128 in an open top up orientation when the bucket 128 is removed from the front-end loader assembly 110 and utilized as a bench (FIG. 7).

The front portion 14 of the body frame is configured to simulate a tractor engine compartment and therefore defines an inner hollow compartment. The front portion 14 includes a cover panel 106 pivotally coupled thereto with hinges 108, latches, or other suitable fasteners for selectively covering the opening of the compartment (FIG. 1). The auxiliary section used with the canopy 50 may be stored in this compartment as well as other desired articles or playthings.

Figure 2:
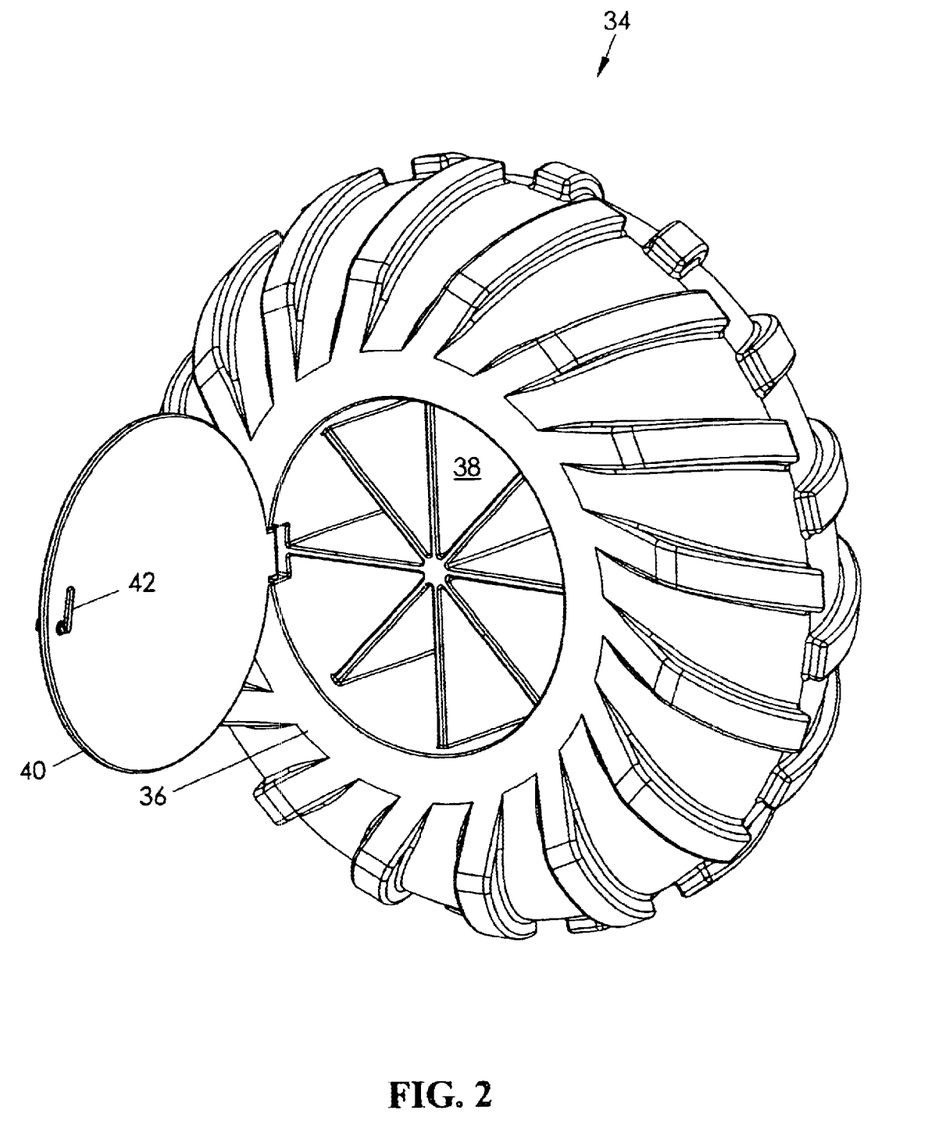
FIG. 2 is a perspective view of a rear wheel removed from the riding toy.
Figure 3A:
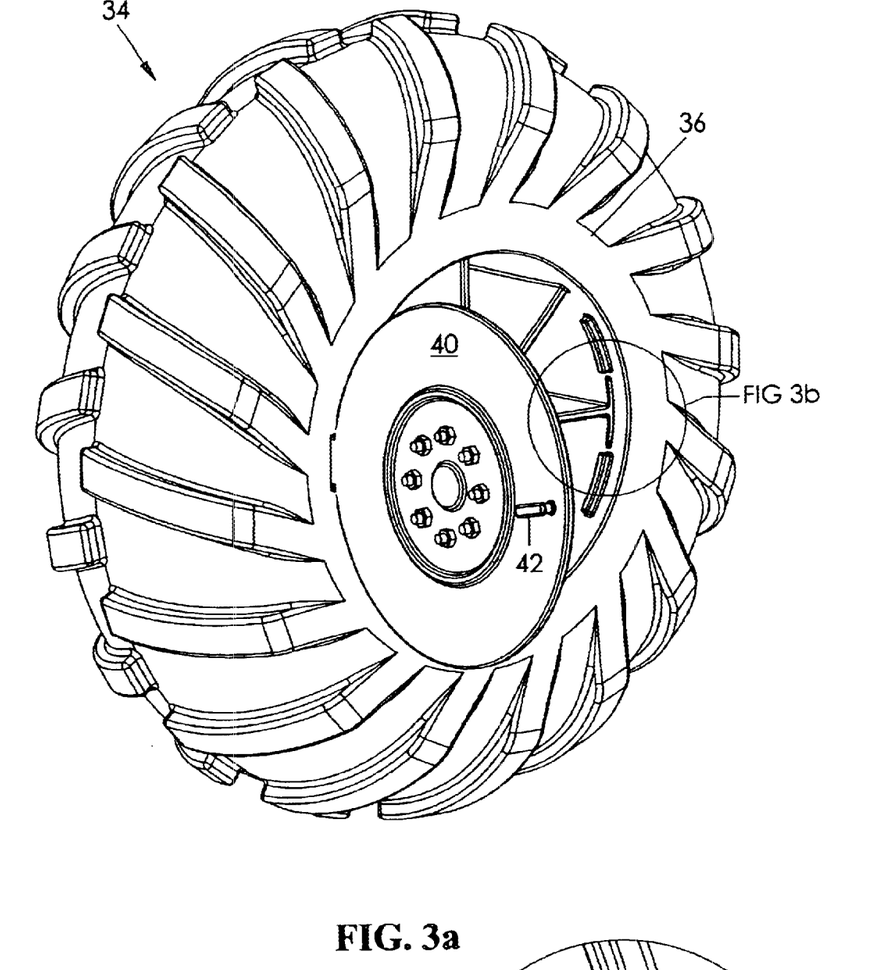
FIG. 3a is another perspective view of the rear wheel as in FIG. 2.
Figure 3B:
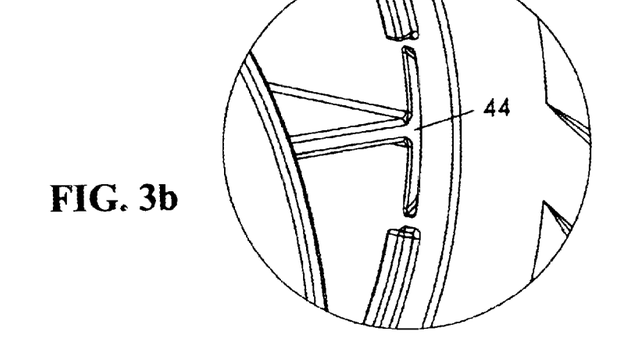

Further, the hub 36 of each rear wheel 34 defines an inner compartment extending from an outer opening partially through the respective wheel, each compartment defining a radial volume oriented about the radial axis of the wheel (FIG. 2). A plurality of partitions 38 may be spaced apart from one another and positioned radially therein for separating articles or playthings selectively stored in the compartment. A door 40 is pivotally connected to each respective hub 36 for selectively covering the compartment opening, each door having a respective handle member 42 configured to fit within a respective hub recess 44 for locking the door 40 to the hub 36 (FIGS. 3 and 3b).

In use, a child user may sit in the seat of the riding toy 10 and propel it forward or backward using the pedals 46. The canopy 50 may be removed from the riding toy 10, supported upon the ground with its legs 61, and used as a picnic table or tent (FIG. 4). A user may also swing the digger assembly 62 laterally or pivot the first 66 and second 72 arms thereof using respective first 88 and second 96 reel assemblies (FIGS. 8 and 9). The child user may release the digger bucket 80 from the second arm 72 of the digger assembly 62, attach the auxiliary handle 84 and operate the bucket 80 as a wagon (FIG. 10). Further, a child user may manually pivot the entire front-end loader assembly 110 or the bucket 128 thereof. The user may release the bucket 128 from the front-end loader assembly 110, slidably reposition the rear wall 140, and use the bucket as a bench (FIG. 7).

Therefore, the transformable riding toy 10 may be used to simulate a real tractor-type digging machine or transformed into a plurality of unrelated playthings.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A transformable riding toy, comprising:
    a body frame coupled to a pair of rear wheels and a pair of front wheels and having a front portion, a rear portion, and a central portion intermediate said front and rear portions, said central portion having a deck and a seat, suitable for a child, mounted on said deck;
    a canopy having a top panel and a plurality of legs depending from said top panel, said plurality of legs having a respective distal ends relative to said top panel removably coupled to said central and rear portions of said body frame, respectively, said plurality of legs adapted to support said top panel parallel to a support surface when removed from said central portion of said body frame; and
    wherein a hub of each rear wheel defines a compartment extending axially partially therethrough with an outwardly positioned opening, each hub including a door pivotally coupled thereto for selectively covering said opening.

2. The transformable riding toy as in claim 1, wherein said top panel of said canopy includes a first panel section and a second panel section, said canopy further comprising:
    a pair of spaced apart guide rods attached to a bottom surface of said second panel section;
    a pair of spaced apart guide members extending longitudinally along a bottom surface of said first panel section, each guide member defining a bore extending longitudinally therethrough for slidably receiving a respective guide rod therein, said first and second panel sections being movable between a first configuration in which said guide rods are substantially received in said bores of respective guide members and a second configuration in which said guide rods are substantially extended from said bores of said respective guide members; and
    an auxiliary panel section adapted to removably rest upon said guide members at said second configuration.

3. The transformable riding toy as in claim 1 further comprising a digger assembly, said digger assembly comprising:
    a first arm having a first end coupled to said rear portion of said body frame, said first arm having an opposed end;
    a second arm having a first end coupled to said opposed end of said first arm, said second end having another end; and
    a bucket releasably coupled to said another end of said second arm, said bucket having a plurality of wheels, said bucket being operative as a wagon when released from said second arm.

4. The transformable riding toy as in claim 3 wherein said first end of said first arm of said digger assembly is pivotally coupled to said rear portion of said body frame and said opposed end of said first arm is pivotally coupled to a point displaced from said first end of said second arm; said digger assembly further comprising:
    a first reel assembly, said first reel assembly having a first spool rotatably coupled to said rear portion of said body frame and a first handle attached to said first spool for rotating said first spool; and
    a first cable having a first end attached to said first spool and a second end attached to said first arm such that said first arm is selectively moved away or toward said rear portion of said body frame upon a respective rotation of said first handle.

5. The transformable riding toy as in claim 1 wherein said digger assembly includes:
    means for holding said first spool at a selected configuration;
    a second reel assembly, said second reel assembly having a second spool rotatably coupled to said rear portion of said body frame and a second handle attached to said second spool for rotating said second spool;
    a second cable having a first end attached to said second spool and a second end attached to said first end of said second arm for pivoting said second arm relative to said first arm upon a respective rotation of said second handle; and
    means for holding said second spool at a selected configuration.

6. The transformable riding toy as in claim 1 further comprising a front-end loader assembly, said front-end loader assembly comprising:
- at least one support arm having a first end pivotally coupled to said front portion of said body frame, said at least one support arm having an opposed end; and
- a bucket releasably coupled to said opposed end of said at least one support arm, said bucket being operative as a bench when released from said at least one support arm.

7. The transformable riding toy as in claim 6 wherein said bucket includes opposed side walls, front and rear walls extending between said side walls, a bottom wall, said side, front, and rear walls defining an open top;
- a pair of first guide members attached to inner surfaces of respective side walls and defining channels therealong generally perpendicular to said bottom wall, said rear wall being selectively removably received in said channels of said first guide members; and
- a pair of second guide members attached to said inner surfaces of said respective side walls and being generally perpendicular to said first guide members, said rear wall being selectively removably received in said channels of said second guide members.

8. A transformable riding toy, comprising:
- a body frame coupled to a pair of rear wheels and a pair of front wheels and having a front portion, a rear portion, and a central portion intermediate said front and rear portions, said central portion having a deck and a seat, suitable for a child, mounted on said deck;
- a first arm having a first end coupled to said rear portion of said body frame, said first arm having an opposed end;
- a second arm having a first end coupled to said opposed end of said first arm, said second end having another end; and
- a first bucket releasably coupled to said another end of said second arm, said bucket having a plurality of wheels, said first bucket adapted to operate as a wagon when released from said second arm.

9. The transformable riding toy as in claim 8 wherein a hub of each rear wheel defines a compartment extending axially partially therethrough with an outwardly positioned opening, each hub including a door pivotally coupled thereto for selectively covering said opening, each compartment including a plurality of partitions radially spaced apart therein, whereby to selectively separate articles placed in said compartment.

10. The transformable riding toy as in claim 8 further comprising a front-end loader assembly, said front-end loader assembly comprising:
- at least one support arm having a first end pivotally coupled to said front portion of said body fame, said at least one support arm having an opposed end; and
- a second bucket releasably coupled to said opposed end of said at least one support arm, said second bucket adapted to operate as a bench when released from said at least one support arm.

11. The transformable riding toy as in claim 8 wherein said first end of said first arm is pivotally coupled to said rear portion of said body frame and said opposed end of said first arm is pivotally coupled to a point displaced from said first end of said second arm; said transformable riding toy further comprising:
- a first reel assembly, said first reel assembly having a first spool rotatably coupled to said rear portion of said body frame and a first handle attached to said first spool for rotating said first spool; and
- a first cable having a first end attached to said first spool and a second end attached to said first arm such that said first arm is selectively moved away or toward said rear portion of said body frame upon a respective rotation of said first handle.

12. The transformable riding toy as in claim 11 further comprising:
- means for holding said first spool at a selected configuration;
- a second reel assembly, said second reel assembly having a second spool rotatably coupled to said rear portion of said body frame and a second handle attached to said second spool for rotating said second spool;
- a second cable having a first end attached to said second spool and a second end attached to said first end of said second arm for pivoting said second arm relative to said first arm upon a respective rotation of said second handle; and
- means for holding said second spool at a selected configuration.

13. The transformable riding toy as in claim 11 further comprising a canopy having a top panel and a plurality of legs depending from said top panel, said plurality of legs having a respective distal ends relative to said top panel removably coupled to said central and rear portions of said body frame, respectively, said plurality of legs adapted to support said top panel parallel to a support surface when removed from said central portion of said body frame.

14. The transformable riding toy as in claim 13 wherein said top panel of said canopy includes a first panel section and a second panel section, said canopy further comprising:
- a pair of spaced apart guide rods attached to a bottom surface of said second panel section;
- a pair of spaced apart guide members extending longitudinally along a bottom surface of said first panel section, each guide member defining a bore extending longitudinally therethrough for slidably receiving a respective guide rod therein, said first and second panel sections being movable between a first configuration in which said guide rods are substantially received in said bores of respective guide members and a second configuration in which said guide rods are substantially extended from said bores of said respective guide members; and
- an auxiliary panel section adapted to removably rest upon said guide members at said second configuration.

15. The transformable riding toy as in claim 13 further comprising a front-end loader assembly, said front-end loader assembly comprising:
- at least one support arm having a first end pivotally coupled to said front portion of said body frame, said at least one support arm having an opposed end; and
- a second bucket releasably coupled to said opposed end of said at least one support arm, said second bucket adapted to operate as a bench when released from said at least one support arm.

16. A transformable riding toy, comprising:
- a body flame coupled to a pair of rear wheels and to a pair of front wheels and having a front portion, a rear portion, and a central portion intermediate said front and rear portions, said central portion having a deck and a seat, suitable for a child, mounted on said deck;

a canopy having a top panel and a plurality of legs depending from said top panel, said plurality of legs having a respective distal ends relative to said top panel removably coupled to said central and rear portions of said body frame, respectively, said plurality of legs adapted to support said top panel parallel to a support surface when removed from said central portion of said body frame;

a first arm having a first end coupled to said rear portion of said body frame, said first arm having an opposed end;

a second arm having a first end coupled to said opposed end of said first arm, said second end having another end;

a first bucket releasably coupled to said another end of said second arm, said bucket having a plurality of wheels, said first bucket adapted to operate as a wagon when released from said second arm;

at least one support arm having a first end pivotally coupled to said front portion of said body frame, said at least one support arm having an opposed end; and a second bucket releasably coupled to said opposed end of said at least one support arm, said second bucket adapted to operate as a bench when released from said at least one support arm.

17. The transformable riding toy as in claim 16 wherein a hub of each rear wheel defines a compartment extending axially partially therethrough with an outwardly positioned opening, each hub including a door pivotally coupled thereto for selectively covering said opening.

* * * * *